(12) United States Patent
Ashworth et al.

(10) Patent No.: US 11,527,898 B2
(45) Date of Patent: Dec. 13, 2022

(54) WIRELESS DEVICE CRADLES

(71) Applicant: WILSON ELECTRONICS, LLC, St. George, UT (US)

(72) Inventors: Christopher Ken Ashworth, St. George, UT (US); Joshua Kent Barnes, Roy, UT (US); Patrick Lee Cook, Cedar City, UT (US); Dale Robert Anderson, Colleyville, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/282,135

(22) Filed: Feb. 21, 2019

(65) Prior Publication Data

US 2019/0260410 A1 Aug. 22, 2019

Related U.S. Application Data

(60) Provisional application No. 62/633,526, filed on Feb. 21, 2018.

(51) Int. Cl.
*H04W 52/02* (2009.01)
*H02J 7/00* (2006.01)
(Continued)

(52) U.S. Cl.
CPC .......... *H02J 7/0044* (2013.01); *H02J 50/10* (2016.02); *H04B 1/3822* (2013.01);
(Continued)

(58) Field of Classification Search
CPC .... H01F 38/14; H01F 27/36; H01F 2005/027; H01F 2005/043; H01F 2005/046;
(Continued)

(56) References Cited

U.S. PATENT DOCUMENTS

| 4,776,032 A | 10/1988 | Odate et al. |
| 5,095,528 A | 3/1992 | Leslie et al. |

(Continued)

FOREIGN PATENT DOCUMENTS

| EP | 1525678 B1 | 7/2008 |
| EP | 2212756 B1 | 9/2011 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

(Continued)

*Primary Examiner* — Quan M Hua
(74) *Attorney, Agent, or Firm* — Thorpe North & Western LLP

(57) ABSTRACT

A user device cradle can include a receiver configured to removably retain a wireless user device. One or more Radio Frequency (RF) signal couplers and one or more power couplers can be disposed in the receiver of the cradle. The one or more RF signal couplers can be configured to couple one or more RF communication signals to the wireless user device, while the one or more power couplers can be configured to couple power to the wireless user device. The coupling of power to the user device can be reduced or minimized when a downlink signal is received by a user device in the user device cradle, or when the user device cradle is in a weak signal area.

29 Claims, 8 Drawing Sheets

SERVER SIDE

DONOR SIDE

USER DEVICE

BASE STATION

(51) Int. Cl.
*H04B 1/3877* (2015.01)
*H04B 7/155* (2006.01)
*H04B 1/3822* (2015.01)
*H02J 50/10* (2016.01)
*H04M 1/72412* (2021.01)

(52) U.S. Cl.
CPC ....... *H04B 1/3877* (2013.01); *H04B 7/15507* (2013.01); *H04B 7/15535* (2013.01); *H04M 1/72412* (2021.01)

(58) Field of Classification Search
CPC .......... H01F 27/402; H01F 3/14; H02J 50/10; H02J 50/12; H02J 50/90; H02J 50/80; H02J 7/0027; H02J 7/0042; H02J 7/025; H02J 50/40; H02J 50/70; H02J 7/0044; H02J 7/00036; H02J 7/045; H02J 7/00034; H02J 50/50; H02J 7/342; H02J 50/20; H02J 7/0045; H02J 7/02; H02J 5/005; H02J 50/30; H02J 50/60; H02J 7/027; H02J 7/35; H02J 2310/22; H02J 50/402; H02J 2310/48; H02J 50/05; H02J 7/0013; H02J 7/00308; H02J 7/0047; H02J 7/04; H02J 7/1461; H02J 2207/20; H02J 2310/44; H02J 50/00; H02J 7/0021; H02J 7/00; H04B 5/0037; H04B 5/0081; H04B 7/155; H04B 1/005; H04B 1/38; H04B 2203/5441; H04B 2203/5479; H04B 3/38; H04B 3/52; H04B 3/54; H04W 16/26; H04W 4/90; H04W 84/045; H04W 4/023; H04W 4/33; H04W 64/003; H04W 76/50; H04W 84/005; H04W 4/80; H04W 52/46; H04W 56/001; H04W 52/343; H04W 56/00; H04W 64/00; H04W 72/0453; H04W 76/20; H04W 84/042; H04W 84/18; H04W 88/04; H04W 88/06; H04W 88/08; H04W 92/16; H04W 24/00; H04W 24/02; H04W 36/22; H04W 4/029; H04W 48/16; H04W 52/245; H04W 52/262; H04W 52/367; H04W 72/0413; H04W 72/085; H04W 84/047; H04W 88/02; H04L 5/14; H04L 5/0069

See application file for complete search history.

(56) References Cited

U.S. PATENT DOCUMENTS

| | | | |
|---|---|---|---|
| 5,303,395 A | 4/1994 | Dayani | |
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 2002/0044594 A1 | 4/2002 | Bongfeldt | |
| 2002/0080067 A1* | 6/2002 | Zamat | H04B 7/0814 342/374 |
| 2003/0100351 A1 | 5/2003 | Friesen et al. | |
| 2003/0123401 A1 | 7/2003 | Dean | |
| 2004/0106967 A1* | 6/2004 | Von Arx | A61N 1/37229 607/60 |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0088146 A1* | 4/2005 | Faunce | H02J 7/0047 320/132 |
| 2005/0118949 A1 | 6/2005 | Allen et al. | |
| 2006/0084379 A1 | 4/2006 | O'Neill. | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2009/0181735 A1 | 7/2009 | Griffin, Jr. et al. | |
| 2010/0151917 A1* | 6/2010 | Wilson | H04M 1/6075 455/571 |
| 2010/0164296 A1* | 7/2010 | Kurs | H01F 38/14 307/104 |
| 2010/0201311 A1 | 8/2010 | Kirby et al. | |
| 2011/0151775 A1 | 6/2011 | Kang et al. | |
| 2011/0217943 A1 | 9/2011 | Ashworth et al. | |
| 2012/0223573 A1 | 9/2012 | Schatz et al. | |
| 2012/0299538 A1* | 11/2012 | Arai | H02J 7/0013 320/108 |
| 2017/0025883 A1* | 1/2017 | Ball | H02J 7/025 |
| 2017/0302097 A1* | 10/2017 | Kim | H02J 7/00036 |
| 2018/0198306 A1* | 7/2018 | Findley | G06F 1/266 |
| 2018/0219409 A1* | 8/2018 | Jin | H02J 50/30 |

OTHER PUBLICATIONS

ADL5513; "1 MHz to 4 GHz, 80 dB Logarithmic Detector/Controller"; Data Sheet; (2008); 12 pages; Analog Devices, Inc.
HMC713LP3E; "54 dB, Logarithmic Detector / Controller, 50-8000 MHz"; Data Sheet; (2010); 12 pages.
HMC909LP4E; "RMS Power Detector Single-Ended, DC-5.8 GHz"; Data Sheet; (2010); 21 pages.
PIC16F873; "28/40-Pin 8-Bit CMOS Flash Microcontrollers"; (2001); Data Sheet; 218 pages.
European Search Report Application No. 19158662.7 dated Aug. 10, 2019; 12 Pages.

* cited by examiner

| | -75 dBm AWGN, RB = 50, QPSK DL&UL, DL TBSI = 0, UL TBSI = 6, UL Closed Loop Power = 0 dBm Decrease DL RS EPRE until 1% < BLER < 2%, record minimum Full Cell BW Power | | | | | | | | | | | | |
|---|---|---|---|---|---|---|---|---|---|---|---|---|
| | No charging | | | | Charging | | | | Delta | | | |
| | DL BW Power @ Edge of Coverage (dBm) | | | | DL BW Power @ Edge of Coverage (dBm) | | | | DL BW Power @ Edge of Coverage (dBm) | | | |
| | B2 | B4 | B5 | B13 | B2 | B4 | B5 | B13 | B2 | B4 | B5 | B13 |
| Galaxy S7 | -77.8 | -76.6 | -79.4 | -79.2 | -76.6 | -74.8 | -75.3 | -78.3 | 1.2 | 1.8 | 4.1 | 0.9 |
| iPhone 6+ | -76.9 | -77.4 | -79.1 | -78.8 | -74.3 | -70 | -72.3 | -78.2 | 2.6 | 7.4 | 6.8 | 0.6 |
| Moto Z | -78.8 | -77.7 | -78.6 | -78.8 | -76.8 | -70.4 | -77.8 | -77.7 | 2 | 7.3 | 0.8 | 1.1 |

FIG. 5

WIRELESS DEVICE CRADLES

RELATED APPLICATIONS

The present application claims the benefit of U.S. Provisional Patent Application No. 62/633,526, filed Feb. 21, 2018, the entire specification of which is hereby incorporated by reference in its entirety for all purposes.

BACKGROUND

Wireless communication systems, such as cellular telephone systems, have become common throughout the world. A wireless repeater or booster is a radio frequency (RF) device used to amplify wireless communication signals in both uplink and downlink communication channels, as illustrated in FIG. 1. The uplink channel is generally referred to as the communication direction from one or more wireless user devices 110 to a base station 120. The downlink channel is generally referred to as the communication direction from the base station 120 to the wireless user device 110. For a wireless telephone system, the base station 120 may be a cell tower, and the wireless user device 110 may be one or more smart phones, one or more tablets, one or more laptops, one or more desktop computers, one or more multimedia devices such as televisions or gaming systems, one or more cellular internet of things (CIoT) devices, and/or other types of computing devices typically referred to as user equipment (UEs). The repeater 130 typically includes one or more signal amplifiers, one or more duplexers and/or couplers, one or more filters and other circuits coupled between two or more antennas. The antennas can include one or more server antennas 140 and one or more donor antennas 150.

DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 illustrates data indicating the charging effect on data reception at a wireless user device.

Figure 1:
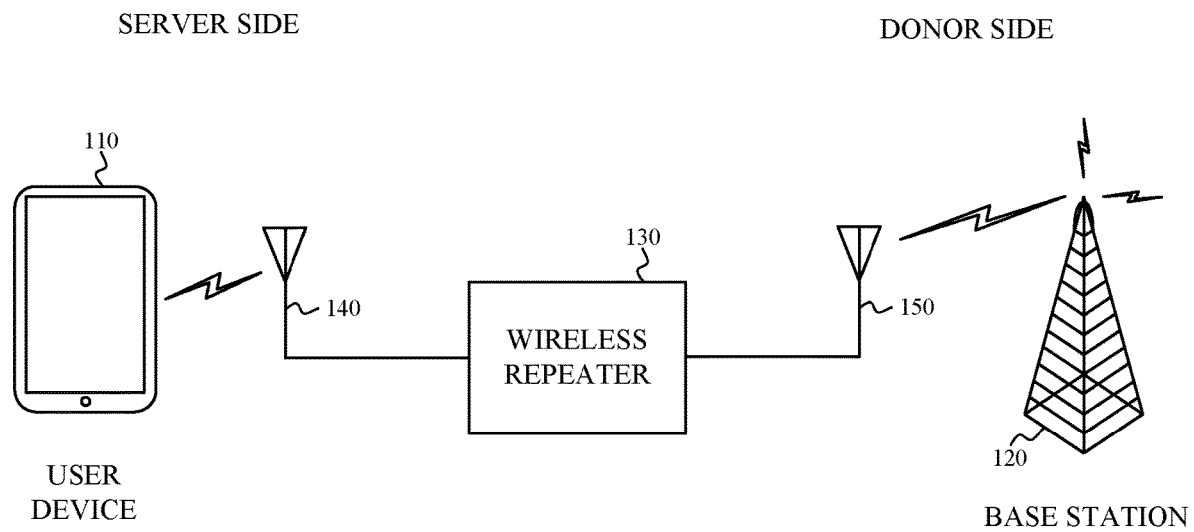
FIG. 1 depicts a wireless system, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION OF THE INVENTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

While using wireless user devices 110 in cars, trucks, boats and other vehicles, the wireless user device 110 can be placed in a cradle to retain the device for hands-free operation while operating the vehicle. While located in the cradle, the wireless user devices 110 may need charging along with the need for amplifying the RF communication signals. Therefore, there is a continuing need for improved wireless repeater systems that can charge wireless devices. In aspects, a cradle for a wireless user device can include a form factor or receiver configured to removably retain wireless user devices in mobile use cases, such as retaining a smart phone proximate a driver of a car, truck, motorhome, boat or other vehicle. One or more Radio Frequency (RF) signal couplers and one or more power couplers can be disposed in the form factor or receiver of the cradle. The one or more RF signal couplers can be configured to wirelessly couple one or more RF communication signals from the cradle to the wireless user device when the wireless user device is retained by the form factor or receiver of the cradle. The one or more power couplers can be configured to wirelessly couple power from the cradle to the wireless user device for charging the wireless user device.

As used herein, the power coupler is configured as a coil, also referred to as an antenna, which is configured to wirelessly transmit and/or receive power with another closely placed coil using inductive coupling or capacitive coupling. The RF signal coupler is configured as an antenna configured to communicate a signal with another closely placed antenna.

In aspects, the cradle can be used in a wireless repeater system. In one implementation, a repeater can be coupled to the one or more RF signal couplers disposed in the form factor or receiver of the cradle. In another implementation, the repeater can be disposed in the cradle form factor with the one or more RF signal couplers. In one implementation, a power supply can be coupled to the one or more power couplers disposed in the form factor or receiver of the cradle. In another implementation, the power supply can be disposed in the cradle form factor or receiver of the cradle with the one or more power couplers.

In aspects, the form factor or receiver of the cradle can be configured to separately accept a plurality of different models of wireless user devices from one or more different manufacturers. The cradle can be configured to hold the wireless user devices in a fixed position relative to the one or more RF signal couplers and/or the one or more power couplers. In aspects, the RF signal couplers in the cradle can be configurable to align with an RF signal coupler in the wireless user device for increased wireless coupling of the one or more RF communication signals to the wireless user device.

The amount of power transferred between two power couplers can be significantly affected by the proximity of the power couplers to each other. In aspects, a location of the power coupler(s) in the cradle can be configurable to allow the power coupler(s) to align with a power coupler in a wireless user device for increased wireless coupling of the power to the wireless user device.

Figure 2A:
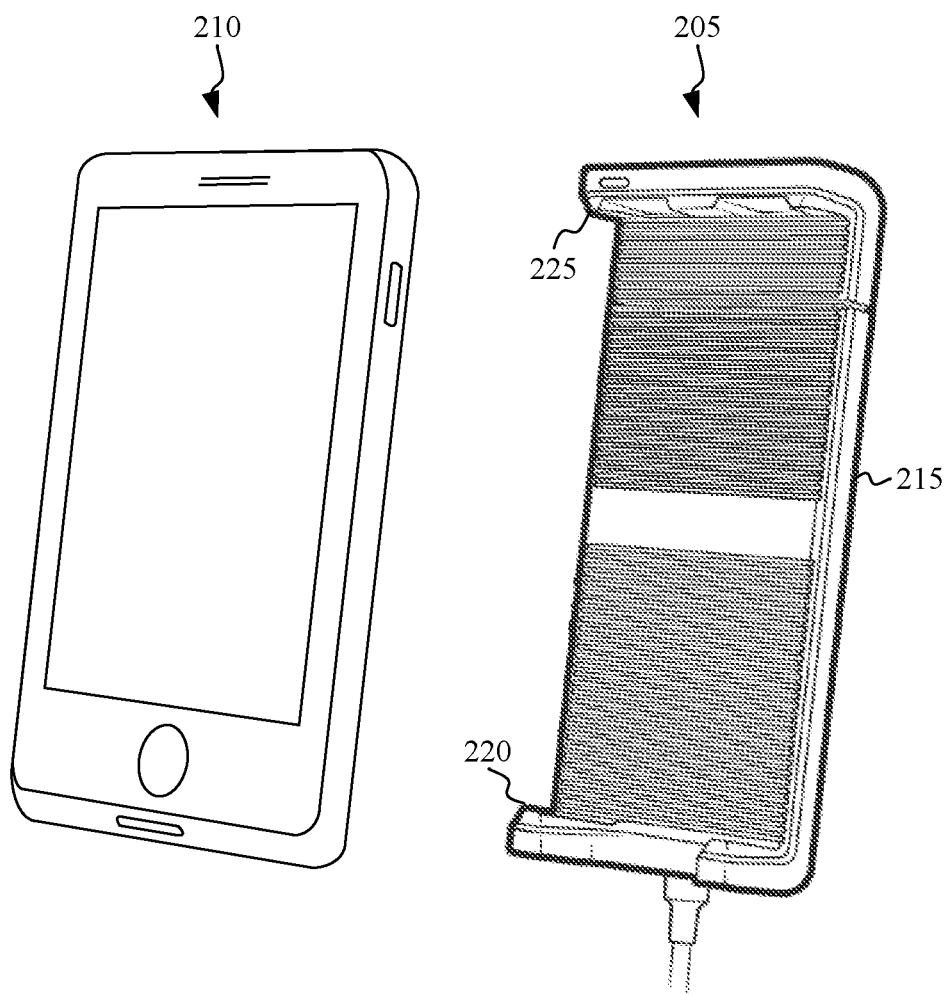
FIGS. 2A-2C depict a cradle for wireless user devices, in accordance with aspects.
Figure 2B:
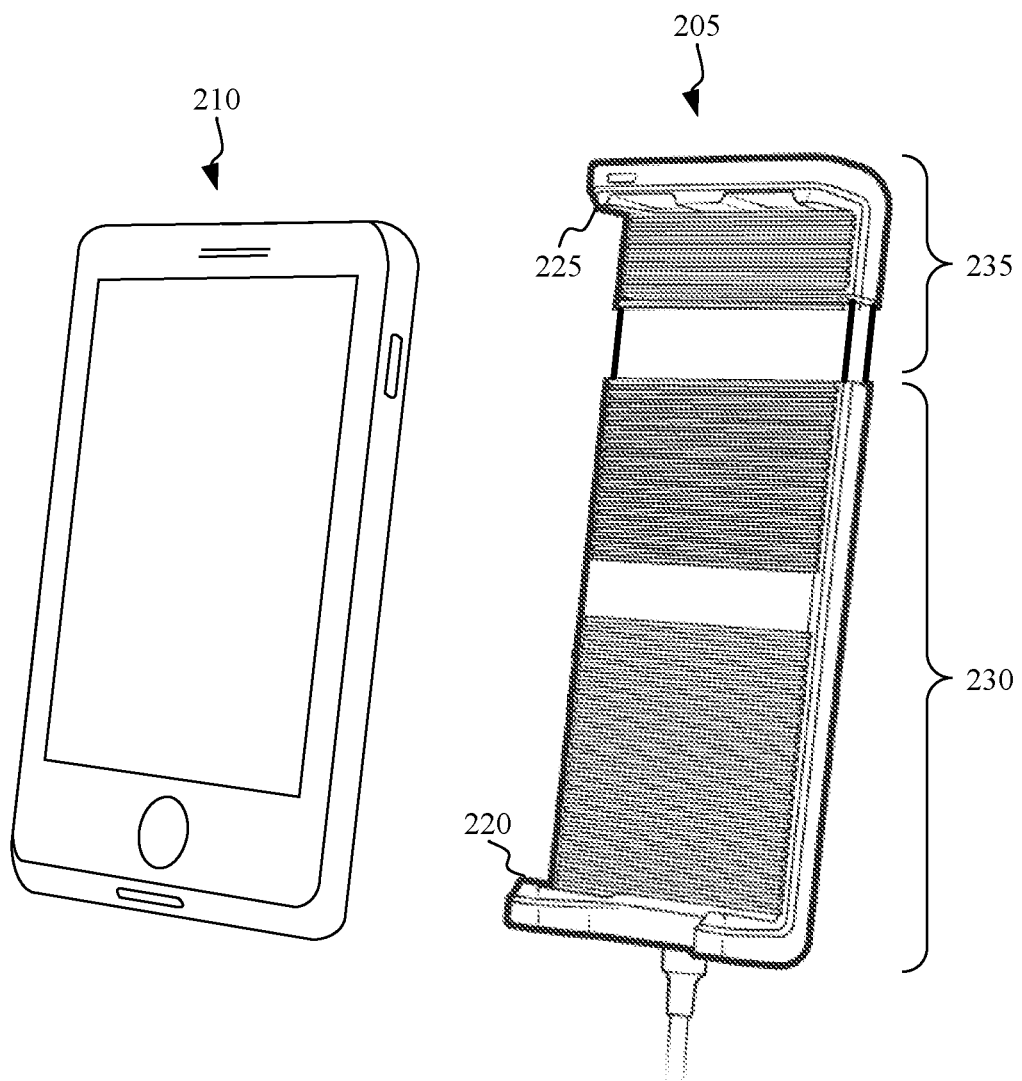
Figure 2C:
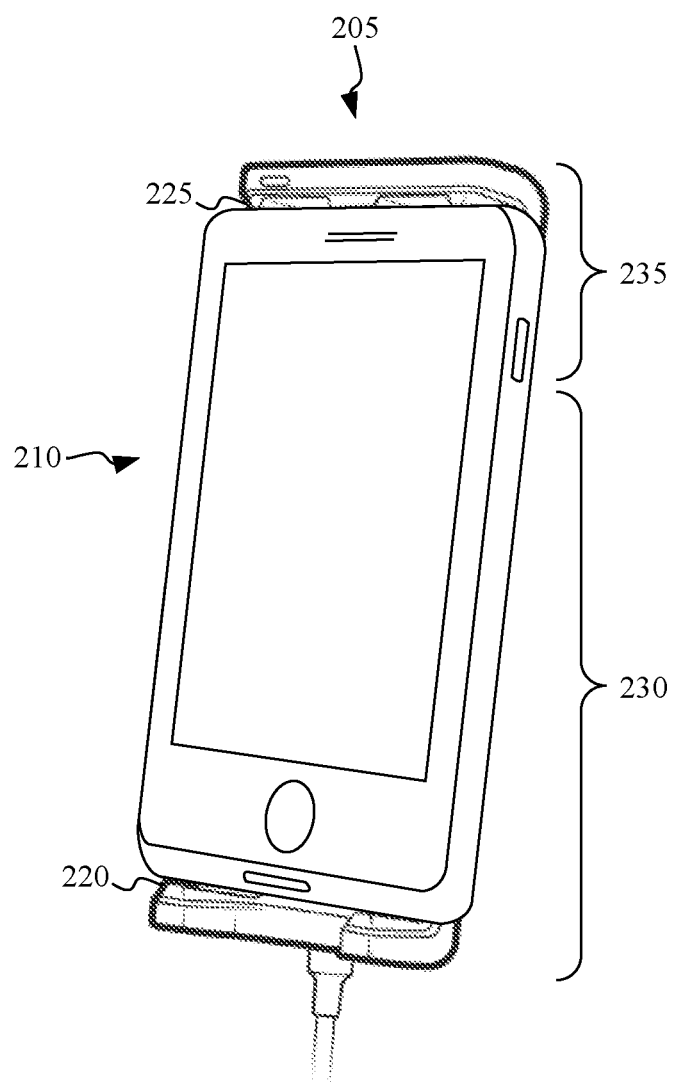

FIGS. 2A-2C depict examples of a cradle for wireless user devices, in accordance with aspects. The cradle 205 can be configured to removably retain a wireless user device 210, provide for coupling of RF communication signals between a repeater and the wireless user device 210, and wireless charge the wireless user device. In aspects, the cradle 205 can be configured to separately accept a plurality of different models of the wireless user devices 210 from one or more different manufacturers. The cradle 205 can include a receiver to selectively carry the wireless user device 210 with respect to a support structure, such as a dash board of a vehicle. The cradle 205 or the receiver can comprise a back 215 and a plurality of retainers 220, 225 configured to removably retain wireless user devices 210 of varying lengths, widths and thicknesses. The cradle 205 and/or the retainer can define an interface capable of spacing the wireless user device 210 with respect to the RF signal coupler and the power coupler, and aligning, or positioning and orienting, the wireless user device 210, and the RF antenna and power coupling thereof, with the RF signal coupler and the power coupler of the cradle 205. In one aspect, the back 215 can define an interface surface capable of abutting to the wireless user device 210 to space the wireless user device 210 with respect to the RF signal coupler and the power coupler. In another aspect, the retainers 220, 225 can align, or position and orient, the wireless user device 210 with respect to the RF signal coupler and the power coupler.

In one aspect, the form factor of the cradle 205 can be the size or physical dimensions, configuration or layout, and/or physical arrangement of the cradle and its various components. The form factor can include a volume defined between the retainers 220, 225, and the back 215, and the location of the RF signal coupler and the power coupler. Thus, the form factor can comprise a three-dimensional volume relative to physical boundaries of the cradle 205, and the location of components, namely the RF signal coupler and the power coupler, relative to the volume. The three-dimensional volume can be irregular or complex, with multiple indentations and/or protrusions. In one aspect, the form factor can be defined by the cradle. In another aspect, the form factor can include the cradle.

In one implementation, a form factor or receiver of the cradle 205 can include a first portion 230 and a second portion 235 extendably coupled together along a given axis, as illustrated in FIG. 2B. A first set of one or more retainers 220 disposed on the first portion 230 and a second set of one or more retainers 225 disposed on the second portion 235 opposite the first set of retainers 220 along the given axis can be configured to engage the wireless user device 210, as illustrated in FIG. 2C. The first and second sets of retainers 220, 225 can be biased toward each other along the given axis to engage the wireless user device 210. The first and second portions 230, 235 of the cradle 205, and the retainers 220, 225, can define the interface for aligning the wireless user device 210. In one implementation, the first and second portions 230, 235 of the cradle 205 can be coupled by one or more springs 317 (FIG. 5), elastic members, or other coupling devices located inside the cradle 205 to bias the first and second sets of retainers 220, 225 toward each other. In one example, as user can pull up on the second portion 235 of the cradle 205 and/or down on the first portion 230 of the cradle 205 to extend the length of the cradle 205, insert a wireless user device 210 between the first and second sets of retainers 220, 225, and then lower the second portion 235 towards the wireless user device 210 to capture the wireless user device 210 in the cradle 205. In other implementations, the cradle 205 can include arms that can be changed to accommodate different size wireless user devices 210. In other implementation, the cradle 205 can include retention means such as Velcro tape, suction cups, gel attachments or the like to retain the wireless user device 210 within the cradle. In yet other implementations, first and second portions 230, 235 of the cradle can include multi-position inter-latching elements that can be adjusted to accommodate different size wireless user devices 210. In other implementations, the cradle 205, the receiver or form factor, and/or the interface or interface surface can include one or more ferromagnetic elements magnetically coupleable to one or more ferromagnetic elements associated with the wireless user device 210 or case thereof. In one embodiment, a single ferromagnetic element can be located on the cradle 205. Another ferromagnetic element can be attached to the wireless user device. The wireless user device can then be magnetically attached to the cradle. In an alternative embodiment, multiple ferromagnetic elements can be attached to the cradle. For example, ferromagnetic elements can be attached at two or more locations of the cradle. Ferromagnetic elements can then be attached to locations on the wireless user device to configure the wireless user device to align with the cradle in a desired position. Aligning the wireless user device with the cradle can allow both the RF signal coupler and the power coupler to be substantially aligned with the wireless user device to maximize power transfer and RF signal coupling between the cradle and the wireless user device.

In another example, the form factor or receiver of the cradle 205 can include a first set of one or more retainers disposed along a first side of the form factor or receiver, a second set of one or more retainers disposed along a second side of the form factor or receiver, and a third set of one or more retainers disposed along a bottom of the form factor or receiver. The first, second and third sets of retainers can be configured to capture the wireless user device 210 by supporting the wireless user device 210 along its corresponding edges.

Figure 3:
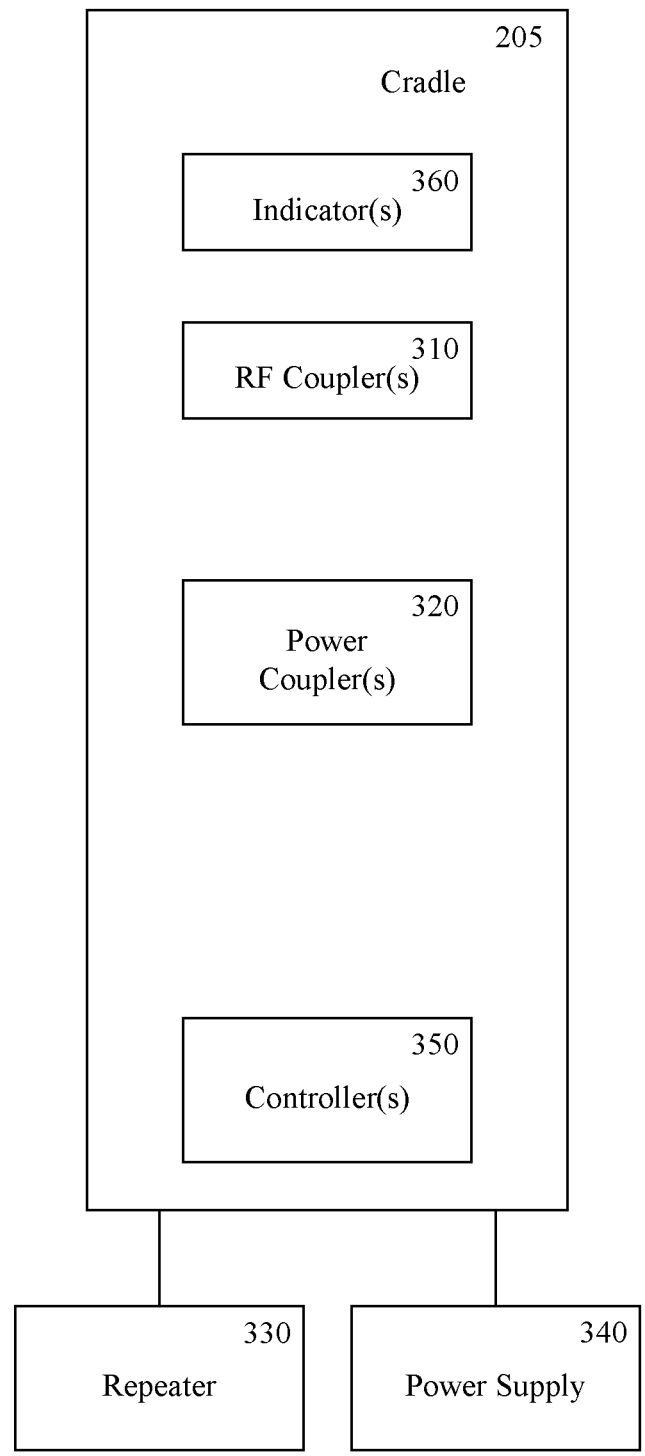
FIG. 3 depicts a wireless user device cradle, in accordance with an example.

FIG. 3 depicts a wireless user device cradle 205, in accordance with an example. In aspects, the cradle 205 can include one or more Radio Frequency (RF) signal couplers 310 and one or more power couplers 320 disposed in the form factor or receiver of the cradle 205. The one or more RF signal couplers 310 can be configured to wirelessly couple one or more RF communication signals between a repeater and the wireless user device, when the wireless user device is retained in the form factor or receiver of the cradle 205. In one implementation, the one or more RF signal couplers 310 can be antennas configured to convert between electromagnetic RF signals propagating through air and electrical RF signals in sub-systems of a corresponding wireless repeater system. The one or more power couplers 320 can be configured to wirelessly couple power to the wireless user device to charge the device when it is retained by the form factor or receiver of the cradle 205. In one instance, the power couplers 320 can be coils configured for inductive coupling of power through magnetic fields that can induce an alternating current in one or more corresponding coils in a wireless user device.

In aspects, a repeater 330 can be coupled to the one or more RF couplers 310 disposed in the form factor or receiver of the cradle 205. The repeater 330 can be configured to amplify one or more RF communication signals to increase a signal strength of the RF communication signals to be received by a wireless user device 210. The repeater 330 can, for example, amplify various types of RF signals, such as cellular telephone, WiFi, satellite, or amplitude modulated/frequency modulated (AM/FM) radio signals. In one instance, one or more bi-direction amplifiers of the repeater 330 can be configured to amplify both uplink and downlink signals of one or more carrier bands.

In one configuration, the repeater 330 can be a Federal Communications Commission (FCC)-compatible consumer signal booster. As a non-limiting example, the repeater 330 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The repeater 330 can be configured to automatically self-monitor its operation to ensure compliance with applicable noise and gain limits. The repeater 330 can either self-correct or shut down automatically if the signal booster's operations violate the regulations defined in FCC Part 20.21. It should be noted that these FCC regulations apply to FCC-compatible consumer repeaters and may not be applicable to a user equipment (UE) in communication with an FCC-compatible consumer repeater. While a repeater that is compatible with FCC regulations is provided as an example, it is not intended to be limiting. The repeater can be configured to be compatible with other governmental regulations based on the location where the repeater is configured to operate.

In one configuration, the repeater 330 can improve the wireless connection between the wireless device 110 and the repeater 330 (e.g., cell tower) or another type of wireless wide area network (WWAN) access point (AP). The repeater 330 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 330 can boost signals for 3GPP LTE Release 16.0.0 (January 2019) or other desired releases. The repeater 330 can boost signals from the 3GPP Technical Specification 36.101 (Release 16 Jan. 2019) bands or LTE frequency bands. For example, the repeater 330 can boost signals from the LTE frequency bands: 2, 4, 5, 12, 13, 17, 25, 26, and 71. The repeater 330 can boost selected frequency bands based on the country or region in which the signal booster is used, including any of 3GPP LTE frequency bands 1 through 85, 3GPP 5G frequency bands 1 through 86, 3GPP 5G frequency bands 257 through 261, or other frequency bands, as disclosed in 3GPP TS 36.104 V16.0.0 (January 2019) or 3GPP TS 38.104 v15.4.0 (January 2019).

In one instance, the RF communication signals can be cellular telephone RF signals, such as a Third-Generation Partnership Project (3GPP) Long Term Evolved (LTE) or 5G uplink and downlink signals. In one instance, the uplink 3GPP LTE or 5G signals may operate in a first channel of a selected frequency division duplex (FDD) first frequency band and the downlink 3GPP LTE or 5G signal may operate at a second channel of the selected FDD frequency band. Alternatively, a 3GPP LTE or 5G time division duplex (TDD) band may be used. This example is not intended to be limiting. New bands for 3GPP LTE operation are frequently disclosed. The repeater 330 can be configured to amplify any desired band that may be used by a wireless mobile device. The repeater 330 can also be configured to simultaneously filter and amplify a plurality of bands simultaneously. For example, the repeater 330 may be configured to simultaneously amplify the bands described in Table 1.

TABLE 1

| | Bands of Operation | | | | | |
| --- | --- | --- | --- | --- | --- | --- |
| | Uplink | | | Downlink | | |
| Band | Fmin (MHz) | Fmax (MHz) | Fc (MHz) | Fmin (MHz) | Fmax (MHz) | Fc (MHz) |
| II | 1850.0 - | 1910.0 | 1880.0 | 1930.0 - | 1990.0 | 1960.0 |
| IV | 1710.0 - | 1755.0 | 1732.5 | 2110.0 - | 2155.0 | 2132.5 |
| V | 824.0 - | 849.0 | 836.5 | 869.0 - | 894.0 | 881.5 |
| XII | 699.0 - | 716.0 | 707.5 | 729.0 - | 746.0 | 737.5 |
| XIII | 776.0 - | 787.0 | 781.5 | 746.0 - | 757.0 | 751.5 |

In aspects, a power supply 340 can be coupled to the one or more power couplers 320 disposed in the form factor or receiver of the cradle 205. The power supply 340 can be configured to supply the energy to the one or more power couplers 320. In one implementation, power supply 340 can convert a direct current potential voltage to an alternating current potential voltage at approximately 105-205 Kilo Hertz (KHz) to drive one or more coils of the power coupler 320. The power supply 340 can also provide power to the repeater 330. Furthermore, although the repeater 330 and power supply 340 are described above as separate sub-circuits, the power supply 340 can be integral to the repeater 330.

In aspects, the form factor or receiver of the cradle 205 can also include one or more controllers 350. The one or more controllers 350 can include an RF signal coupler controller circuit configured to tune the one or more RF signal couplers 310 based one or more signal bands of the one or more RF communication signals. The RF signal coupler controller circuit can also, alternatively or in addition, be configured to tune the one or more RF signal couplers 310 based on operation of the one or more power couplers 320. In one implementation, a controller 350 can select a given capacitance load from a switch capacitance bank to tune one or more RF signal couplers 310. The one or more controllers 350 can also include controllers for positioning the one or more RF couplers 310 in the form factor or receiver of the cradle 205 relative to one or more RF couplers in the wireless user device 210, and/or the one or more power couplers 320 in the cradle 205 and/or in the wireless user device 210. The controller 350 for positioning the one or more RF couplers 310 in the form factor or receiver of the cradle 205 may, in one implementation, be a lever operable by a user for positioning one or more antennas in the cradle 205 based upon the particular wireless user device 210 being used with the cradle 205 in a setup phase. Alternatively, one or more controllers 350 can select one or more RF couplers from a plurality of RF couplers 310 disposed in the cradle 205 to optimize performance of the repeater and/or wireless charging subsystems.

An inductive power coupler can use relatively long lengths of coil wire. The coil wire can take up a lot of space. In order to transfer power efficiently, the inductive power coupler also needs to be well-aligned to the corresponding coupler in the wireless user device 210. The RF coupler can also benefit (measured by coupling loss) from being well-aligned to the wireless user device RF antenna.

Both the RF coupler antenna 310 and the inductive power coupler coil 320 can use a fair amount of real estate, meaning some compromises might have to be made. For example, the inductor power coupler is normally wound in round loops. The loops could potentially be vertically compressed, resulting in an elliptical shape. The use of an elliptical shape can free up additional space in the cradle 205 for the RF coupler. The two types of couplers can both be metal and can couple together. This co-coupling of the RF coupler antenna 310 and the inductive power coupler coil 320 can cause challenges in tuning the couplers to maximize power transfer and communication with the wireless user device 210.

The inductive power coupler coil 320 design and the RF coupler antenna 310 design can be configured to account for the co-coupling effects. For example, a tunable matching network (for each coupler) can be used to adjust the coupler based on proximity and/or coupling effects of the two couplers on each other.

Theoretically the user device also co-coupling between the RF coupler antenna and inductive power coupler coil in the wireless user device 210. However, the wireless user device doesn't normally expect to couple the RF in the near field. Additionally, the user device may use only one power coupler loop. The charging cradle 205 can include several power coupler loops. One or more of the power coupler loops can be selected based on which loop couples best to the wireless user device 210. This adds an extra degree of difficulty for the cradle design that the user device does not face. The wireless power transfer may utilize inductive coupling, magnetic resonant coupling optical power transfer or the like. Optical power transfer can potentially have a smaller footprint and cause less interference with the RF coupler, although it would have to be very well aligned. Making the couplers location-adjustable is one way to account for different user device coupler locations and sizes.

Figure 4:
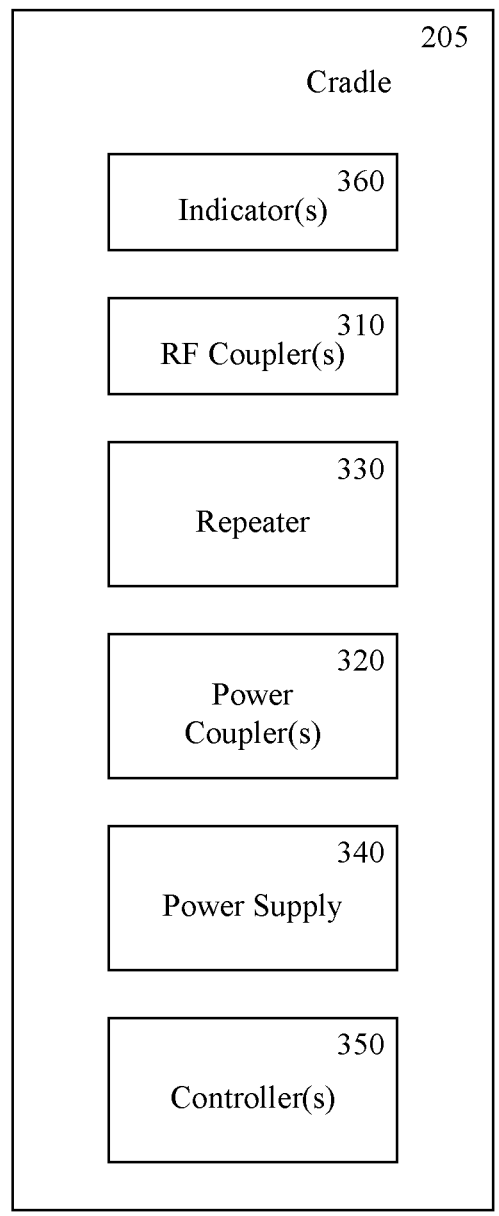
FIG. 4 depicts a wireless user device cradle, in accordance with an example.

FIG. 4 depicts a wireless user device cradle, in accordance with an example. In aspects, the cradle can include one or more Radio Frequency (RF) signal couplers 310, one or more power couplers 320, a repeater 330, and a power supply 340 disposed in the form factor or receiver of the cradle 205. In aspects, a wireless repeater system including the one or more RF signal couplers 310, the one or more power couplers 320, the repeater 330, and the power supply 340 can be integrated into a single form factor or receiver of the cradle 205. The one or more RF couplers 310 can be configured to transmit and receive one or more RF communication signals between the repeater 330 and a wireless user device 210. The one or more RF couplers 310 are further described above with respect to FIGS. 2A-2C and 3. The one or more power couplers 320 can be configured to transfer energy to the wireless user device. The one or more power couplers 320 are further described above with respect to FIGS. 2A-2C and 3.

In aspects, the repeater 330 can be configured to amplify the one or more RF communication signals to increase a signal strength of the RF communication signals transmitted to (i.e. a downlink signal) or transmitted from (i.e. an uplink signal) the wireless user device 210. The repeater 330 is further described above with respect to FIGS. 2A-2C, 3, and 5. The power supply 340 can be configured to supply the energy to the one or more power couplers 320, repeater 330, indicators 360, and controllers 350. The power supply 340 is further described above with respect FIGS. 2A-2C and 3.

Referring now to FIG. 2C in combination with FIGS. 3 and 4, the form factor or receiver of the cradle 205 can be configured to retain a wireless user device 210 within a fixed distance of the one or more power couplers 320. In one implementation, the back 215 and retainers 220, 225 of the cradle 205 can be configured to retain the wireless user device 210 so that one or more inductive power couplers in the cradle 205 are within 4-40 millimeters (mm) of one or more corresponding inductive power couplers in the wireless user device 210. Similarly, the form factor or receiver of the cradle 205 can be configured to retain the wireless user device 210 in a fixed position relative to the one or more RF signal couplers 310.

Measurements have indicated that cell phone performance can degrade while a battery in a phone is being charged. FIG. 5 provides test data recorded using a Samsung Galaxy S7, iPhone 6+, and Moto Z cellular wireless phones. Measurements of received downlink signals were performed for the cellular wireless phones while the phones were being charged and while no charging was occurring. In this example, wired charging was used for the cellular phones. However, similar effects have been shown for wireless charging as well.

Power levels for the received downlink signals in FIG. 5 are provided as a received signal strength indicator. An average white Gaussian noise (AWGN) of −75 dBm was used in the measurement with a resource block (RB) size of 50. A downlink transport block size (TBSI) of zero and an uplink transport block size of six was used. Power is also measured in the average power of Resource Elements (RE) that carry cell specific Reference Signals (RS) over the entire bandwidth. This is referred to as received signal received power (RSRP). Power is also measured in received signal received quality (RSRQ), which is defined as (N×RSRP)/RSSI, where RSSI is the received signal strength indicator and N is the number of resource blocks (RBs) over the measurement bandwidth.

As illustrated in FIG. 5, a downlink signal was transmitted to the cellular phones. The power level of the downlink signal was decreased until the cellular phones had a block error rate (BLER) of between one percent and two percent. The minimum full cell bandwidth power (RSSI) was then recorded. The values shown in the no charging and charging sections of FIG. 5 were recorded as RSSI in units of dBm. The downlink signal was transmitted on several different 3GPP LTE bands, including 3GPP LTE bands 2, 4, 5 and 13.

As can be seen in FIG. 5, the power level at which each cellular phone had a block error rate between one percent and two percent were greater when the phone was charging than when the phone was not charging. Since the block error rate was lower with a lower power level when the phones were not charging, it infers that the phones can receive a downlink signal over a greater link distance when they are not charging. It also infers that the phones can use a greater modulation and coding scheme (MCS) to allow the phones to receive higher data rates at the same distance when the phones are not charging, relative to when the phones are charging.

FIG. 5 shows the difference (delta) in power at which the phones had a block error rate of between one percent and two percent when they phones were charging, relative to when the phones were not charging. For example, at Band 4 (B4), there was a delta of 7.4 dB, showing that the same phone had approximately the same bit error rate with a downlink signal that was 7.4 dBm lower in power (−77.4 dBm relative to −70.0 dBm) when the phone was not charging. In each of the tests at the different bands, with the different phones, a downlink signal with a lower power (between 0.9 and 7.4 dB lower) was able to provide a similar block error rate when the phone was not charging. Accordingly, the phones can have a longer link distance and/or a higher MCS to allow more data to be received when the phones are not charging.

Thus, it was determined that the cellular phones can have fewer dropped calls, longer link distances, and increased data rates when the cellular phones were not being charged while receiving a downlink signal.

In one aspect, the controller 350 can be configured to communicate with both the power coupler(s) 320 and the repeater 330. The controller 350 can turn off the power coupler(s) 320, or reduce the amount of power at the power coupler(s) 320, when an uplink or downlink signal is amplified at the repeater. By turning off, or reducing the power at the power coupler(s) 320, the degradation of a received signal (i.e. a downlink signal) or a transmitted signal (i.e. an uplink signal) during charging of the wireless user device 210 can be reduced. This can allow the wireless user device to have higher data rates (reception of uplink data or transmission of downlink data).

In one implementation, the controller(s) 350 can be configured to enable/disable wireless or wired charging at the cradle 205. The controller 350 can be in the repeater 330 and configured to communicate with both the repeater 330 and control the power directed to the power coupler(s) 320. The controller 350 can also be in communication with the RF coupler(s) 310 to determine when an uplink signal or downlink signal is communicated. The power level at the power coupler(s) 320 can be reduced or turned off when an uplink signal or a downlink signal is communicated at the RF coupler(s) 310. Alternatively, the controller 350 can be coupled to the cradle 205 and configured to communicate with one or more of the repeater 330, power coupler(s) 320, and RF coupler(s) 310.

In addition, when the wireless user device 210 is located in a weak signal area (i.e. an edge of a base station transmission area), the degradation of the uplink and/or downlink signal can cause the downlink signal to be dropped at the wireless user device or the uplink signal to be too weak to be received at the base station. Accordingly, the controller 350 can be configured to turn off the power coupler(s) 320 or reduce the amount of power at the power coupler(s) 320 when the user device is in a weak signal area. This enables a link to a downlink signal to be maintained at the wireless user device 210.

In one embodiment, the downlink signal from a base station can be received, filtered, and amplified by the repeater 330 and then communicated to the wireless user device 210 via an RF coupler 310 antenna, as previously discussed. By reducing or turning off the power at the power coupler(s) 320, when data is being transmitted via the repeater 330 and RF coupler(s) 310, the data rates can be increased and/or the link distance can be increased.

In one implementation, the repeater 330 can be configured to detect a strong uplink signal from the user wireless device 210. The strong uplink signal (i.e. higher than a predetermined threshold level) is a good indication that the repeater 330 (and wireless user device 210) are located in a weak signal area, since the wireless user device 210 is configured to transmit an uplink signal at a high power level when a downlink signal with a low power level is received at the wireless user device. Thus, when the repeater 330 determines that the wireless user device 210 is transmitting an uplink signal at a power level that is greater than a predetermined threshold power, it can be assumed that the wireless user device 210 is in a weak signal area. In one example, the threshold power level for the uplink signal can be greater than or equal to 0 dBm.

Similarly, when a downlink signal is received at the repeater 330, a relatively low power downlink signal, received from a base station, can infer that the repeater 330 and wireless user device 210 are in a weak signal area. In one example, the threshold power level for the downlink signal can be less than or equal to −90 dBm. The example threshold power levels for the uplink and downlink examples are not intended to be limiting. The actual threshold power levels are dependent upon system design requirements of the cradle and repeater, wireless user device types, and so forth.

When it is determined that the wireless user device 210 is in a weak signal area, the controllers 350 in the cradle 205 can turn off or reduce the power to the power coupler(s) 320 or a wired power supply 340. By reducing or disabling wired or wireless charging in a weak signal area, the wireless user device 210 can continue to receive a downlink signal from the repeater 330 and the uplink signal transmitted from the wireless user device 210 can be received by the repeater 330, filtered, amplified, and transmitted to a base station 120 (FIG. 1) with a sufficient power level for the base station 120 to receive the uplink signal.

In one example, the controller(s) 350 can be configured to send a selected amount of power to the power coupler(s) 320 based on the power level of the uplink signal received at the repeater 330. The amount of power sent to the power coupler(s) 320 can be proportional to the power level of the uplink signal received at the repeater 330.

In another example, the controller(s) 350 can be configured to pulse the power level sent to the power coupler(s) 320. For example, the power sent to the power coupler(s) 320 can be reduced or turned off when a downlink signal for the wireless user device 210 or an uplink signal from the wireless user device 210 is received at the repeater 330. The power level sent to the power coupler(s) 320 can be maximized when no uplink or downlink signal is received at the repeater.

In another example, the controller(s) 350 can be configured to pulse the power level sent to the power coupler(s) 320 when the wireless user device is in the weak signal area. For example, the controller(s) 350 can be in communication with a battery power level of the wireless user device 210. When the battery power level is below a selected threshold level, and the wireless user device is in the weak signal area, then the power level sent to the power coupler(s) 320 can be pulsed to allow the data rate to be at a maximum when the power level is pulsed off, while still allowing the wireless user device to charge.

In another example, the controller(s) 350 can be configured to communicate with the wireless user device 210 to determine when a downlink signal is received and/or an uplink signal is transmitted. For example, the controller(s)

350 in the cradle 205 can communicate with the wireless user device using Bluetooth or WiFi. The power level, sent to the power coupler(s) 320 in the cradle 205 or directly to the user device 210 via a wired connection, can be reduced or turned off when it is determined, at the cradle 205 via Bluetooth or WiFi signaling from the wireless user device 210, that the downlink signal is received and/or an uplink signal is transmitted by the wireless user device 210.

Figure 6:
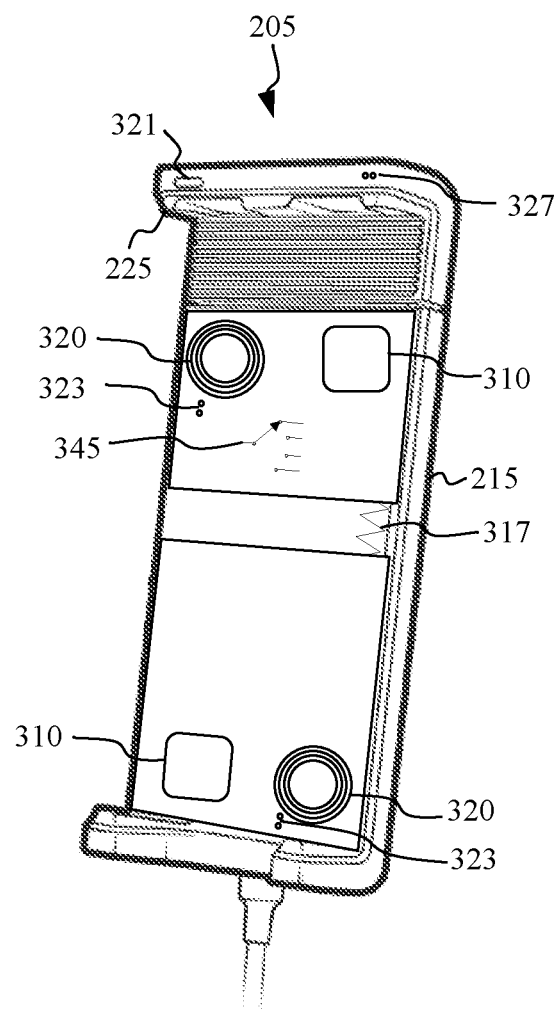
FIG. 6 depicts a wireless user device cradle, in accordance with another example.

In another example, wireless charging can be manually controlled via an application on the wireless user device (210) or a switch or button 321 located on the cradle 205, as illustrated in FIG. 6. An indicator, such as LED 327, can be used to indicate when a signal is being received, and/or when the wireless user device 210 is located in the weak signal area. A user can then manually switch off wireless charging at the cradle 205 using the switch or button 321.

While wireless charging of the wireless user device 210 via the power coupler(s) 320 in the cradle 205 has been provided in the examples above, they are not intended to be limiting. Wired charging of the wireless user device 210 can also reduce or degrade the data rate or cause signal drop at the wireless user device 210, as shown in FIG. 5. In another example, a power supply 340 at the cradle 205 can be used to provide wired power to the wireless user device 210. The power sent to the wireless user device 210 from the cradle 205, via a wired connection, can be decreased or turned off when a downlink signal is received or a downlink signal is transmitted.

In one implementation, as illustrated in the example of FIG. 6, the cradle 205 can include a plurality of RF couplers 310 and a plurality of power couplers 320. The size, shape, and location of the RF couplers 310 and power couplers 320 in FIG. 6 is not intended to be restricting. The number of, and size and shape of the RF coupler antenna and power coupler coil can be determined based on the needs of the system design of the cradle 205. In one example, one or more controllers 350 can automatically select one of a plurality of RF couplers from a plurality of RF couplers 310 based on a signal strength of the RF communication signals received at each RF coupler 310, and/or based on a mutual coupling between the RF couplers 310 and the power couplers 320. In another implementation, one or more switches 345 may enable a user to manually select one or more RF couplers 310 from a plurality of RF couplers based upon a particular wireless user device 210. In yet another implementation, positioning RF couplers 310 in an extendable portion 235 of the cradle 205 can also be utilized to align one or more RF couplers in the cradle 205 with one or more RF couplers in a given wireless user device 210, while also possibly increasing the separation between the one or more RF couplers 310 and the one or more power couplers 320 in the cradle 205.

The one or more controllers 350 can also include a power coupler controller circuit configured to tune the one or more power couplers 320 based on an operation of the one or more RF couplers 310. In one implementation, a controller 350 can select one of a plurality of taps 323 of an inductive power coupler to adjust the inductance of the one or more power couplers 320. The one or more controllers 350 can also include controllers for positioning the one or more power couplers 320 in the form factor or receiver of the cradle 205 relative to one or more power couplers in the wireless user device 210, and/or the one or more RF couplers 310 in the cradle 205. The controller 350 for positioning the one or more power couplers 320 in the form factor or receiver of the cradle 205 may, in one implementation, be a lever operable by a user for positioning one or more coils in the cradle 205 based upon the particular wireless user device 210 being used with the cradle 205 in a setup phase. For example, a user can move a level to align the one or more power couplers 320 in the cradle 205 with one or more power couplers in the wireless user device 210 to increase wireless coupling of power to the wireless user device 210. Alternatively, one or more controllers 350 can automatically select one or more power couplers from a plurality of power couplers 320 disposed in the cradle 205 to optimize performance of the repeater and/or wireless charging subsystems. In another implementation, one or more switches 345 can enable a user to manually select one or more power couplers from a plurality of power couplers 320 based upon a particular wireless user device 210.

In aspects, one or more controllers 350 can also be utilized to controller the wireless charging operation of the one or more power couplers 320. In one implementation, the wireless user device 210 can provide feedback concerning the amount of power to be transmitted by the inductive power coupler of the cradle. For example, the wireless user device 210 can communicate with cradle 205 using backscatter modulation that includes modulating the load on the one or more coils of the inductive power couplers in the wireless user device, which changes the current draw at the power couplers 320 in the cradle 205. One or more controllers 350 in the cradle 205 can monitor the modulated current draw to determine the power requirement of the wireless user device 210. The one or more controllers 350 can control the operation of the one or more power couplers 320 and/or power supply 340 to deliver the power requirement signaled by the wireless user device 210.

The above described mechanisms for adjusting the position of RF couplers 310, selecting RF couplers 310 for use, tuning the RF couplers 310, and the like, are not intended to be limiting. Other techniques for adjusting the position of RF couplers 310, selecting RF couplers 310 for use, tuning the RF couplers, and the like can also be utilized. Similarly, the above described mechanisms for adjusting the position of power couplers 320, selecting power couplers 320 for use, tuning the power couplers 320 and the like, are not intended to be limiting. Other techniques for adjusting the position of power couplers 320, selecting power couplers 320 for use, tuning the power couplers, and the like can also be utilized.

In aspects illustrated in the examples of FIGS. 4 and 5, the form factor or receiver of the cradle 205 can optionally include one or more indicators 360. The one or more indicators 360 can be configured to indicate when a repeater 330 is amplifying one or more RF communications signals. For example, a first indicator can be a light emitting diode (LED) 327 that emits a light controlled by the repeater 330 to indicate when the repeater 330 is powered up. Similarly, one or more indicators 360 can be configured to indicate when at least one of the one or more power couplers 320 are aligned within a predetermined range of one or more power couplers in the wireless user device 210, and/or when the power couplers 320 are transferring energy to the wireless user device 210. For example, a second indicator can be a LED that emits a flashing green light when one or more of the power couplers 320 in the cradle 205 are aligned with one or more power couplers in the wireless user device 210, and a red light that indicates when the one or more power couplers in the cradle 205 are not aligned with one or more power couplers in the wireless user device 210. A solid green light from the LED can indicate when one or more of the power couplers 320 in the cradle 205 are transferring energy to the wireless user device 210. Another LED can be used to indicate when one or more RF couplers 310 in the cradle 205 are aligned with an antenna in a wireless user device. Alternatively, fewer LEDs or other types of indicators can be used with a variety of colors to provide desired indications. The above examples of indicators are not intended to be limiting. There are numerous other combinations of lights, sounds, vibrations and the like that can be used to indicate various states of the repeater and wireless charger.

EXAMPLES

The following examples pertain to specific technology embodiments and point out specific features, elements, or actions that can be used or otherwise combined in achieving such embodiments.

Example 1 includes a wireless signal amplification system including a cradle for a wireless user device, comprising: a cradle receiver with an interface capable of selectively carrying the wireless user device; a Radio Frequency (RF) signal coupler disposed in the form factor, the RF signal coupler configured to wirelessly couple one or more RF communication signals to the wireless user device when the wireless user device is retained by the form factor; a cellular repeater configured to be coupled to the RF signal coupler; a power coupler disposed in the form factor, the power coupler configured to wirelessly couple power to the wireless user device to charge the wireless user device when the wireless user device is retained by the form factor; and a power coupler controller configured to provide a selected amount of power to the power coupler when one or more of: a power level of an uplink signal transmitted by the wireless user device is greater than a selected threshold level at the cellular repeater, or a downlink signal at the cellular repeater is less than a selected threshold level.

Example 2 includes the wireless signal amplification system of Example 1, wherein the cradle receiver is configured to separately accept a plurality of different wireless user devices.

Example 3 includes the wireless signal amplification system of Example 1, wherein the cradle receiver includes a plurality of retainers configured to retain the wireless user device within a fixed distance from the power coupler.

Example 4 includes the wireless signal amplification system of Example 1, wherein the cradle receiver includes a first cradle portion and a second cradle portion biased toward each other by a spring to removably retain the wireless user device.

Example 5 includes the wireless signal amplification system of Example 1, wherein the cradle receiver includes a first cradle portion and a second cradle portion biased toward each other by an elastic member to removably retain the wireless user device.

Example 6 includes the wireless signal amplification system of Example 1, wherein the cradle receiver includes a plurality of arms to removably retain the wireless user device.

Example 7 includes the wireless signal amplification system of Example 1, wherein the interface is capable of aligning the wireless user device with the RF signal coupler and the power coupler.

Example 8 includes the wireless signal amplification system of Example 1, wherein the RF signal coupler in the cradle receiver is movably configurable to align with a RF signal coupler in the wireless user device for increased wireless coupling of the one or more RF communication signals to the wireless user device.

Example 9 includes the wireless signal amplification system of Example 1, wherein the power coupler in the cradle receiver is movably configurable to align with a power coupler in the wireless user device for increased wireless coupling of the power to the wireless user device.

Example 10 includes the wireless signal amplification system of Example 1, further comprising: a plurality of RF signal couplers disposed in the cradle receiver; and a controller configured to select one of the plurality of RF signal couplers to wirelessly couple the one or more RF communication signals to the wireless user device.

Example 11 includes the wireless signal amplification system of Example 1, further comprising: a plurality of power couplers disposed in the cradle receiver; and a controller configured to select one of the plurality of power couplers to wirelessly couple the power to the wireless user device.

Example 12 includes the wireless signal amplification system of Example 1, further comprising: a power coupler controller configured to control an on and off operation of the power coupler in response to an indication from the wireless user device.

Example 13 includes the wireless signal amplification system of Example 12, further comprising: a RF signal coupler controller configured to tune the RF signal coupler based on the operation of the power coupler or in response to the wireless user device.

Example 14 includes the wireless signal amplification system of Example 13, further comprising: the RF signal coupler controller further configured to tune the RF signal coupler based on one or more signal bands of the RF communication signals.

Example 15 includes the wireless signal amplification system of Example 1, further comprising a cellular repeater disposed in the cradle receiver.

Example 16 includes a wireless repeater system comprising: a cradle with a receiver having an interface configured to hold a user device in place relative to the cradle; one or more antennas disposed in the receiver, the one or more antennas configured to transmit and receive one or more RF communication signals between a repeater and the user device; one or more power couplers disposed in the receiver, the one or more inductive power couplers configured to transfer energy to the user device; and the interface being capable of aligning the wireless user device with the one or more antennas and the one or more power coupler.

Example 17 includes the wireless repeater system of Example 16, wherein the one or more power couplers include one or more inductive power couplers.

Example 18 includes the wireless repeater system of Example 16, wherein the one or more power couplers include one or more magnetic resonant power couplers.

Example 19 includes the wireless repeater system of Example 16, wherein the one or more power couplers include one or more optical power couplers.

Example 20 includes the wireless repeater system of Example 16, further comprising: a repeater configured to be coupled to the one or more antennas disposed in the receiver, the repeater configured to amplify the one or more RF communication signals to increase a signal strength of the RF communication signals coupled to the user device.

Example 21 includes the wireless repeater system of Example 20, wherein the repeater comprises a cellular repeater.

Example 22 includes the wireless repeater system of Example 16, further comprising: a power supply coupled to the one or more inductive power couplers disposed in the receiver, the power supply configured to supply the energy to the one or more inductive power couplers.

Example 23 includes the wireless repeater system of Example 16, further comprising: the repeater disposed in the receiver and coupled to the one or more antennas, the repeater configured to amplify the one or more RF communications signals to increase a signal strength of the RF communication signals coupled to the user device.

Example 24 includes the wireless repeater system of Example 23, wherein the interface is capable of aligning the wireless user device with the one or more antennas and the one or more power coupler.

Example 25 includes the wireless repeater system of Example 16, further comprising: a power supply disposed in the receiver and coupled to the one or more inductive power couplers, the power supply configured to supply the energy to the one or more inductive power couplers.

Example 26 includes the wireless repeater system of Example 16, wherein the receiver includes a first portion and a second portion extendably coupled together along a given axis, wherein a first retainer disposed on the first portion and a second retainer disposed on the second portion are configured to engage the user device.

Example 27 includes the wireless repeater system of Example 26, wherein the first retainer and the second retainer are biased toward each other along the given axis.

Example 28 includes the wireless repeater system of Example 16, further comprising: an indicator disposed in the receiver, the indicator configured to indicate when the repeater is amplifying the one or more RF communications signals.

Example 29 includes the wireless repeater system of Example 16, further comprising: an indicator disposed in the receiver, the indicator configured to indicate when at least one of the one or more inductive power couplers is transferring energy to the user device.

Example 30 includes the wireless repeater system of Example 16, further comprising: a controller configured to control operation the one or more inductive power couplers to transfer the power to the user device.

Example 31 includes a user device cradle comprising: a receiver with an interface configured to selectively carry a user device; one or more Radio Frequency (RF) signal couplers carried by the receiver, the one or more RF signal couplers configured to couple one or more RF communication signals to the user device; one or more power couplers carried by the receiver, the one or more power couplers configured to couple power to the user device; and the interface being capable of aligning the user device with the one or more RF signal couplers and the one or more power couplers.

Example 32 includes the user device cradle of Example 31, wherein the receiver includes a first portion and a second portion extendably coupled together along a given axis, wherein a first retainer of the first portion and a second retainer of the second portion disposed opposite the first retainer are biased to contract toward each other along the given axis.

Example 33 includes the user device cradle of Example 32, wherein the first and second retainers are configured to hold the user device in a fixed position relative to the one or more RF signal couplers and the one or more power couplers.

Example 34 includes the user device cradle of Example 31, wherein the receiver includes a first retainer disposed along a first side of the form factor, a second retainer disposed along a second side of the form factor, and a third retainer disposed along a bottom of the form factor, wherein the first, second and third retainers are configured to hold the user device in a fixed position relative to the one or more RF signal couplers and the one or more power couplers.

Example 35 includes the user device cradle of Example 31, further comprising: a RF signal coupler controller configured to tune the one or more RF signal couplers based on one or more signal bands of the one or more RF communication signals.

Example 36 includes the user device cradle of Example 35, further comprising: the RF signal coupler controller further configured to tune the one or more RF signal couplers based on operation of the one or more power couplers.

Example 37 includes the user device cradle of Example 31, further comprising: a power coupler controller configured to tune the one or more power couplers based on operation of the one or more RF signal couplers.

Example 38 includes the user device cradle of Example 31, wherein a first RF signal coupler is disposed in a top portion of the receiver.

Example 39 includes the user device cradle of Example 31, wherein: a first RF signal coupler is disposed in a top portion of the receiver; and a second RF signal coupler is disposed in a bottom portion of the receiver.

Example 40 includes the user device cradle of Example 31, wherein the one or more power couplers are disposed in a middle portion of the receiver.

Example 41 includes the signal amplification system of Example 1, wherein the power coupler controller is configured to perform one or more of: turn off power to the power coupler when one or more of: the power level of the uplink signal transmitted by the wireless user device is greater than the selected threshold level at the cellular repeater, or the downlink signal at the cellular repeater is less than the selected threshold level; decrease the power to the power coupler when one or more of: the power level of the uplink signal transmitted by the wireless user device is greater than the selected threshold level at the cellular repeater, or the downlink signal at the cellular repeater is less than the selected threshold level; turn on power to the power coupler when one or more of: the power level of the uplink signal transmitted by the wireless user device is less than the selected threshold level at the cellular repeater, or the downlink signal at the cellular repeater is greater than the selected threshold level; or increase power to the power coupler when one or more of: the power level of the uplink signal transmitted by the wireless user device is less than the selected threshold level at the cellular repeater, or the downlink signal at the cellular repeater is greater than the selected threshold level.

Example 42 includes the wireless repeater system of Example 16, further comprising a power coupler controller configured to provide a selected amount of power to the power coupler when one or more of: a power level of an uplink signal transmitted by the user device is greater than a selected threshold level at the cellular repeater, or a downlink signal at the cellular repeater is less than a selected threshold level.

Example 43 includes a wireless repeater system comprising: a cradle with a receiver having an interface configured to hold a wireless user device in place relative to the cradle; a cellular repeater configured to be coupled to the cradle; one or more antennas disposed in the receiver, the one or more antennas configured to transmit and receive one or more RF communication signals between the repeater and the user device; a power coupler controller configured to control power sent to the user device when one or more of: a downlink signal is being received at the user device or the user device is located in a weak signal area.

Example 44 includes the wireless repeater system of Example 43, further comprising: one or more inductive power couplers disposed in the receiver, the one or more inductive power couplers configured to transfer energy to the wireless user device to charge a battery in the wireless user device; wherein the power coupler controller is configured to: turn off power to the one or more inductive power couplers when one or more of: a power level of an uplink signal transmitted by the wireless user device is greater than a selected threshold level at the cellular repeater, or a power level of a downlink signal at the cellular repeater is less than a selected threshold level; decrease the power to the one or more inductive power couplers when one or more of: the power level of the uplink signal transmitted by the wireless user device is greater than the selected threshold level at the cellular repeater, or the downlink signal at the cellular repeater is less than the selected threshold level; turn on power to the one or more inductive power couplers when one or more of: the power level of the uplink signal transmitted by the wireless user device is less than the selected threshold level at the cellular repeater, or the downlink signal at the cellular repeater is greater than the selected threshold level; or increase power to the one or more inductive power couplers when one or more of: the power level of the uplink signal transmitted by the wireless user device is less than the selected threshold level at the cellular repeater, or the downlink signal at the cellular repeater is greater than the selected threshold level.

Example 45 includes the wireless repeater system of Example 43, further comprising: a power supply, the power supply configured to provide power to the wireless user device to charge a battery in the wireless user device; wherein the power coupler controller is configured to: turn off power from the power supply to the wireless user device when one or more of: the power level of an uplink signal transmitted by the wireless user device is greater than a selected threshold level at the cellular repeater, or a power level of a downlink signal received at the cellular repeater is less than a selected threshold level; decrease the power from the power supply to the wireless user device when one or more of: the power level of the uplink signal transmitted by the wireless user device is greater than the selected threshold level at the cellular repeater, or the downlink signal at the cellular repeater is less than the selected threshold level; turn on power from the power supply to the wireless user device when one or more of: the power level of the uplink signal transmitted by the wireless user device is less than the selected threshold level at the cellular repeater, or the downlink signal at the cellular repeater is greater than the selected threshold level; or increase power from the power supply to the wireless user device when one or more of: the power level of the uplink signal transmitted by the wireless user device is less than the selected threshold level at the cellular repeater, or the downlink signal at the cellular repeater is greater than the selected threshold level.

Example 46 includes the wireless repeater system of Example 43, further comprising: one or more inductive power couplers disposed in the cradle, the one or more inductive power couplers configured to transfer energy to the user device; wherein the power coupler controller is configured to: turn off power to the one or more inductive power couplers when the wireless user device is receiving a downlink signal; decrease power to the one or more inductive power couplers when the wireless user device is receiving the downlink signal; turn on power to the one or more inductive power couplers when the wireless user device is not receiving the downlink signal; or increase power to the one or more inductive power couplers when the wireless user device is not receiving the downlink signal.

Example 47 includes the wireless repeater system of Example 43, further comprising: a power supply disposed in the receiver, the power supply configured to provide power to the wireless user device to charge a battery in the wireless user device; wherein the power coupler controller is configured to control the power supply to: turn off power to the wireless user device when the wireless user device is receiving a downlink signal; decrease power to the wireless user device when the wireless user device is receiving the downlink signal; turn on power to the wireless user device when the wireless user device is not receiving the downlink signal; or increase power to the wireless user device when the wireless user device is not receiving the downlink signal.

Aspects of the present technology advantageously provide a cradle including wireless boosting of RF communication signals for wireless user devices in combination with wirelessly charging of the wireless user devices. The cradle can advantageously retain wireless user devices of varying lengths, widths and thicknesses from various manufacturers. The RF couplers and/or power couplers can advantageously be manually or automatically configurable to align with RF couplers and/or power couplers in the wireless user device while maintaining separation between the RF couplers and the power couplers.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. A wireless signal amplification system including a cradle for a wireless user device, comprising:
    a cradle receiver with an interface having a form factor capable of selectively carrying the wireless user device;
    a Radio Frequency (RF) signal coupler disposed in the form factor, the RF signal coupler configured to wirelessly couple one or more RF communication signals to the wireless user device when the wireless user device is retained by the form factor;
    a cellular repeater configured to be coupled to the RF signal coupler;
    a power coupler disposed in the form factor, the power coupler configured to wirelessly couple power to the wireless user device to charge the wireless user device when the wireless user device is retained by the form factor; and
    a power coupler controller configured to provide a selected amount of power to the power coupler when one or more of: a power level of an uplink signal transmitted by the wireless user device is greater than a selected threshold level at the cellular repeater, or a downlink signal at the cellular repeater is less than a selected threshold level.

2. The signal amplification system of claim 1, wherein the cradle receiver is configured to separately accept a plurality of different wireless user devices.

3. The signal amplification system of claim 1, wherein the cradle receiver includes a plurality of retainers configured to retain the wireless user device within a fixed distance from the power coupler.

4. The signal amplification system of claim 1, wherein the cradle receiver includes a first cradle portion and a second cradle portion biased toward each other by a spring to removably retain the wireless user device.

5. The signal amplification system of claim 1, wherein the cradle receiver includes a first cradle portion and a second cradle portion biased toward each other by an elastic member to removably retain the wireless user device.

6. The signal amplification system of claim 1, wherein the cradle receiver includes a plurality of arms to removably retain the wireless user device.

7. The signal amplification system of claim 1, wherein the interface is capable of aligning the wireless user device with the RF signal coupler and the power coupler.

8. The signal amplification system of claim 1, wherein the RF signal coupler in the cradle receiver is movably configurable to align with a RF signal coupler in the wireless user device for increased wireless coupling of the one or more RF communication signals to the wireless user device.

9. The signal amplification system of claim 1, wherein the power coupler in the cradle receiver is movably configurable to align with a power coupler in the wireless user device for increased wireless coupling of the power to the wireless user device.

10. The signal amplification system of claim 1, further comprising:
a plurality of RF signal couplers disposed in the cradle receiver; and
a controller configured to select one of the plurality of RF signal couplers to wirelessly couple the one or more RF communication signals to the wireless user device.

11. The signal amplification system of claim 1, further comprising:
a plurality of power couplers disposed in the cradle receiver; and
a controller configured to select one of the plurality of power couplers to wirelessly couple the power to the wireless user device.

12. The signal amplification system of claim 1, further comprising:
the power coupler controller configured to control an on and off operation of the power coupler in response to an indication from the wireless user device.

13. The signal amplification system of claim 12, further comprising:
a RF signal coupler controller configured to tune the RF signal coupler based on the operation of the power coupler or in response to the wireless user device.

14. The signal amplification system of claim 13, further comprising:
the RF signal coupler controller further configured to tune the RF signal coupler based on one or more signal bands of the RF communication signals.

15. The signal amplification system of claim 1, wherein the cellular repeater is disposed in the cradle receiver.

16. The signal amplification system of claim 1, wherein the power coupler controller is configured to perform one or more of:
turn off power to the power coupler when one or more of: the power level of the uplink signal transmitted by the wireless user device is greater than the selected threshold level at the cellular repeater, or the downlink signal at the cellular repeater is less than the selected threshold level;
decrease the power to the power coupler when one or more of: the power level of the uplink signal transmitted by the wireless user device is greater than the selected threshold level at the cellular repeater, or the downlink signal at the cellular repeater is less than the selected threshold level;
turn on power to the power coupler when one or more of: the power level of the uplink signal transmitted by the wireless user device is less than the selected threshold level at the cellular repeater, or the downlink signal at the cellular repeater is greater than the selected threshold level; or
increase power to the power coupler when one or more of: the power level of the uplink signal transmitted by the wireless user device is less than the selected threshold level at the cellular repeater, or the downlink signal at the cellular repeater is greater than the selected threshold level.

17. A wireless repeater system comprising:
a cradle with a receiver having an interface configured to hold a user device in place relative to the cradle;
one or more antennas disposed in the receiver, the one or more antennas configured to transmit and receive one or more RF communication signals between the repeater and the user device;
one or more wireless power couplers disposed in the receiver, the one or more wireless power couplers configured to transfer energy to the user device;
a cellular repeater disposed in the receiver and coupled to the one or more antennas, the cellular repeater configured to amplify the one or more RF communications signals to increase a signal strength of the RF communication signals coupled to the user device; and
a power coupler controller configured to provide a selected amount of power to the one or more wireless power couplers when one or more of: a power level of an uplink signal transmitted by the user device is greater than a selected threshold level at the cellular repeater, or a downlink signal at the cellular repeater is less than a selected threshold level.

18. The wireless repeater system of claim 17, wherein the one or more wireless power couplers include one or more inductive power couplers.

19. The wireless repeater system of claim 17, wherein the one or more wireless power couplers include one or more magnetic resonant power couplers.

20. The wireless repeater system of claim 17, wherein the one or more wireless power couplers include one or more optical power couplers.

21. The wireless repeater system of claim 17, further comprising:
a repeater configured to be coupled to the one or more antennas disposed in the receiver, the repeater configured to amplify the one or more RF communication signals to increase a signal strength of the RF communication signals coupled to the user device.

22. The wireless repeater system of claim 21, wherein the interface is configured to align the user device with the one or more antennas and with one or more location adjustable wireless power couplers disposed in the receiver.

23. The wireless repeater system of claim 17, further comprising:
a power supply coupled to the one or more wireless power couplers disposed in the receiver, the power supply configured to supply the energy to the one or more wireless power couplers.

24. The wireless repeater system of claim 17, further comprising:
a power supply disposed in the receiver and coupled to the one or more wireless power couplers, the power supply configured to supply the energy to the one or more wireless power couplers.

25. The wireless repeater system of claim 17, wherein the receiver includes a first portion and a second portion extendably coupled together along a given axis, wherein a first retainer disposed on the first portion and a second retainer disposed on the second portion are configured to engage the user device.

26. The wireless repeater system of claim 25, wherein the first retainer and the second retainer are biased toward each other along the given axis.

27. The wireless repeater system of claim 17, further comprising:
   an indicator disposed in the receiver, the indicator configured to indicate when at least one of the one or more wireless power couplers is transferring energy to the user device.

28. The wireless repeater system of claim 21, wherein the repeater further comprises a controller configured to select one of a plurality of wireless couplers from the one or more wireless power couplers that couples more power to the wireless user device than other wireless power couplers in the one or more wireless power couplers.

29. The wireless repeater system of claim 21, wherein the repeater further comprises a controller configured to select one of a plurality of antennas from the one or more antennas disposed in the receiver based a signal strength of the one or more RF communication signals received at each of the one or more antennas.

\* \* \* \* \*